Jan. 2, 1951 L. L. BURNS, JR 2,536,260
DEVICE FOR REPRODUCING MAGNETIC RECORDS
Filed Dec. 30, 1948
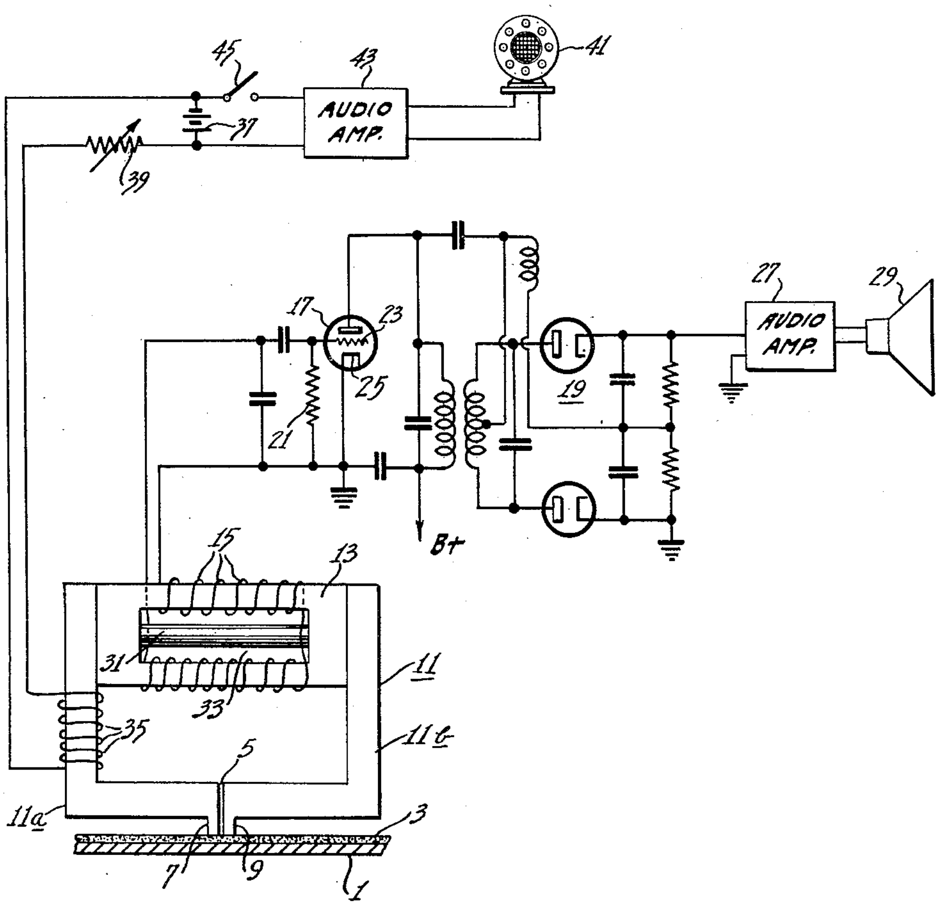
INVENTOR
LESLIE L. BURNS, JR.
BY Morris A. Rabkin
ATTORNEY Patented Jan. 2, 1951 2,536,260

UNITED STATES PATENT OFFICE 2,536,260

DEVICE FOR REPRODUCING MAGNETIC RECORDS

Leslie L. Burns, Jr., Princeton, N. J., assignor to Radio Corporation of America, a corporation of Delaware Application December 30, 1948, Serial No. 68,227

6 Claims. (Cl. 179—100.2)

My present invention relates to improvements in the art of transcribing magnetically recorded signals.

The frequency response-characteristic of present day magnetic phonographs (or "telegraphones") as such instruments are sometimes called) is not linear, but is a function of the frequency of the recorded signals. The low frequency signals are attenuated and it is therefore necessary to provide a disproportionate gain for the low audio frequencies in order to restore them to their original volume. This gives rise to 60 cycle hum problems and to microphonic feed-back problems and hence complicates the electrical and mechanical design of the instrument.

Accordingly, the principal object of my present invention is to provide a magnetic phonograph having a substantially linear frequency response characteristic.

Another and related object of my invention is to provide a novel and sensitive method of, and apparatus for, picking-up and translating magnetically-recorded signals, and one applicable to telegraphone records of standard form (tape, wire, disc or cylinder) and recorded in any conventional manner (i. e. longitudinal, transverse or perpendicular magnetization).

The foregoing objects are achieved in accordance with the method of my invention by generating electrical oscillations and varying the frequency of the said oscillations in accordance with the magnetic intensity of the signals at successive points on the sound track upon which the signals are recorded, and then demodulating said frequency-varied oscillations and converting the said demodulated electrical signals into audible signals.

My invention is described in greater detail in connection with the accompanying partly diagrammatic view of a magnetic phonograph embodying the invention.

In the embodiment of my invention which I have selected for illustration, 1 designates, generally, a reelable tape-like record, having a powdered iron sound-track 3 thereon, which will be understood to be wound to run (between a storage reel and take-up reel, not shown) in a path which spans the non-magnetic gap 5 between the polar extremities 7 and 9 of a magnetic transducer 11 of a construction dictated by the principle of my invention. In the instant case the transducer 11 comprises a split ring or rectagular yoke comprising two preferably laminated L-shape magnetic structures 11a, 11b, arranged in juxtaposition and provided with a cross-arm 13 constituted of a material which exhibits a relatively large (as compared to powdered iron) permeability change when the degree of saturation of the material is changed. Such material may be a homogeneous crystalline material composed of ferric-oxide and the oxide of another metal, this material being known in the art, and being referred to hereinafter, as "ferrite."

The signals on the sound track 3 pass to one pole piece or polar extremity 7 through the high permeability ferrite cross-arm or core 13 to the other pole piece 9 and back to the sound track. The variations in magnetization of the sound track, which represent the recorded signals, are thus impressed on the ferrite core 13. The variations in the intensity of the magnetic flux, from the sound track, passing through the ferrite core 13 change the permeability of the ferrite in accordance with the previously recorded signals.

As shown in the drawing; there is a radio frequency coil 15 wound on the ferrite arm or core 13. This coil comprises the frequency determining inductor of a vacuum tube oscillator 17 operating at any conveniently low radio frequency. As the inductance of this coil 15 changes, as a result of the changes in permeability of the ferrite material, the frequency of the oscillator changes. These changes in frequency are then converted to audio signals in any convenient manner, e. g. by means of a balanced discriminator circuit 19 of the type disclosed and claimed in U. S. Patent 2,121,103 issued to S. W. Seeley on June 21, 1938. Alternatively, the audio signals may be taken off across a resistor 21 connected between the grid 23 and cathode 25 of the vacum tube oscillator 17. In either event the audio signals are preferably applied to an audio amplifier 27 prior to being applied to a loudspeaker 29 or other suitable signal reproducing apparatus.

It is of course apparent that the magnetic signals upon the sound-track 3 would be erased if the R. F. oscillations, applied to the ferrite core 13 through the coil 15, were permitted to impinge upon the sound track. This possibility is minimized by constructing the L-shape parts 11a—11b of the transducer of soft iron and by making the ferrite core 13 of open work construction so that the latter comprises a complete magnetic circuit for the radio frequency flux.

I apply a magnetic bias to the ferrite core 13 so that the transducer may be operated on a linear and sensitive portion of the permeability vs. magnetic flux curve. In the instant case this bias is provided by a permanent magnet 31 which is conveniently mounted within the central aperture 33 of the core 13. In order to prevent the flux of this magnet 31 from reaching the sound track 3 and erasing or distorting the signals thereon I provide a balancing coil 35 around one arm of the yoke. This coil 35 is supplied with direct current from a source exemplified by a battery 37 and potentiometer 39. Recording may be accomplished by applying audio signals from a source, exemplified by a microphone 41 and amplifier 43, to the balancing coil 35 through a switch 45 thus making it unnecessary to provide a separate magnetic transducer for this purpose.

I claim as my invention:

1. In a magnetic phonograph, magnetic means of variable permeability defining a flux path having a non-magnetic gap therein, said magnetic means including a pair of pole pieces and a ferrite core member intermediate said pole pieces remote from said gap, biasing means associated with said ferrite member, means for moving a magnetically recorded sound-track across said gap, and an oscillation generator having a frequency determining inductor coupled to said ferrite member and subject to the effects of variations in the permeability in said flux path incident to the movement of said magnetically recorded sound-track across said gap.

2. A magnetic phonograph comprising, magnetic means defining a flux path having a non-magnetic gap therein, said magnetic means comprising a pair of pole pieces and a core member intermediate said pole pieces remote from said gap, said core member being constituted of a material exhibiting a relatively large permeability change for a relatively small change in flux, means for moving a magnetically recorded sound-track across said gap, an oscillation generator having a frequency determining inductor coupled to said magnetic means and subject to the effects of variations in the permeability in said flux path incident to the movement of said magnetically recorded sound-track across said gap, and a frequency discriminator for demodulating the variable frequency output of said oscillation generator.

3. A sound-head for picking-up signals from a magnetic record, said sound-head comprising a bi-part magnetic structure having polar extremities defining the boundaries of a non-magnetic gap across which said record may be moved, a core portion constituted of a ferrite material mounted remote from said gap and connecting the parts of said bi-part magnetic structure, and coil means mounted upon said core portion for impressing radio frequency oscillation upon said ferrite material.

4. The invention as set forth in claim 3 wherein said core serves as a support for a permanent magnet.

5. The invention as set forth in claim 4 and wherein said magnetic structure serves as a support for a coil through which direct current may be applied to said structure.

6. In a magnetic phonograph, magnetic means of variable permeability defining a flux path having a non-magnetic gap therein, said magnetic means comprising a pair of soft iron pole pieces and a ferrite core member intermediate said pole pieces remote from said gap, said ferrite member being in the form of an endless figure having a central aperture and providing a closed magnetic path, a permanent magnet mounted in said aperture to magnetically bias said ferrite member, means for moving a magnetic record across said gap, and an oscillation generator having a frequency determining inductor wound on said ferrite member and subject to the effects of variations in the permeability in said flux path incident to the movement of said record across said gap.

LESLIE L. BURNS, JR.

REFERENCES CITED

The following references are of record in the file of this patent:

FOREIGN PATENTS

| Number | Country | Date |
|---|---|---|
| 70,462 | Norway | May 20, 1946 |